Patented Apr. 28, 1942

2,280,858

UNITED STATES PATENT OFFICE 2,280,858

ACYL DERIVATIVES OF GERMINAL GLAND HORMONE PREPARATIONS OF HIGH ACTIVITY, AND A METHOD OF PRODUCING THE SAME

Walter Schoeller, Berlin-Westend, and Friedrich Hildebrandt, Hohen Neuendorf, near Berlin, Germany, and Erwin Schwenk, Montclair, N. J., assignors to Schering Corporation, Bloomfield, N. J., a corporation of New Jersey No Drawing. Original application February 21, 1935, Serial No. 7,604. Divided and this application October 9, 1936, Serial No. 104,848. In Germany February 22, 1934

8 Claims. (Cl. 260—397.5)

This invention relates to acyl derivatives of germinal gland hormone preparations of high physiological activity and more particularly to acyl derivatives of compounds of an activity similar to that of the male sex hormones, and a method of producing the same.

The present application is a division of our copending application Serial No. 7,604, filed February 21, 1935.

Hormone alcohols such as are obtained, for example, by the reaction of keto-containing saturated germinal gland hormones with organometallic halides, followed by hydrolysis, as described in application Serial No. 748,664 of Friedrich Hildebrandt, are distinguished by their physiological activity being similar to that of the male germinal gland hormones. Said compounds, however, are so quickly eliminated from the organism that frequent applications are necessary in order to attain a lasting effect.

Now we have discovered that the esters of the hormones or hormone-like substances have a more lasting action and the disadvantage above mentioned can accordingly be remedied by using, instead of the alcohols or keto alcohols, their esters, which only gradually are eliminated from the organism. The esters form, so to speak, a hormone deposit in the organism.

Known methods may be employed for the production of these esters. Thus, for instance, the alcohols may be reacted with acid chlorides in the presence of inorganic or organic bases. Of course, other acylation methods may also be used. When dihydroxy compounds are employed, mono- or diacyl derivatives are formed, depending on the method used.

For instance, by carrying out the reaction in a solvent wherein the primarily formed monoacyl derivative is soluble only with difficulty, the acylation can be interrupted after the formation of the monoacyl derivative.

On carrying out the acylation in a solvent wherein the mono- as well as the diacylation products are kept in solution, both hydroxy groups can be acylated.

The terms "acylation process" and "acylating agent" as used hereinafter in the specification and the claims include the known processes and agents for introducing an acyl group into a compound. The acylation may be carried out by using the acid anhydride or the acid chloride or the acid itself as acylating agents in the presence or absence of catalysts or in any other known manner.

A further method for arriving at these esters consists in the hydrogenation of the esters of the corresponding phenolic compounds, such as the alkyl derivatives of the follicle hormones produced, for example, by reacting an ether solution of follicle hormone with alkyl magnesium iodide, followed by hydrolysis and extraction with ether, as described in application Serial No. 748,664 above referred to, or the esters of the follicle hormone hydrate and similar products. The hydrogenation is interrupted when the aromatic nucleus is completely saturated. This method has the advantage that it is possible with its help to arrive at monoacyl compounds of said saturated polyalcohols. Thus, there is produced, for instance, by catalytic hydrogenation of the "methyldiol" of the formula $C_{19}H_{26}O_2$, acylated on the phenolic hydroxy group, the "3-acoxy hexahydro methyldiol."

The production of this type of partially esterified polyalcohols is therapeutically of interest and, besides, these compounds are important as intermediate products for the production of compounds of the character of germinal gland hormones. In order to carry out the hydrogenation catalytically activated hydrogen is used in the known manner.

Instead of using catalytically activated hydrogen as hydrogenating agent, other reducing agents capable of hydrogenating carbon-to-carbon double bonds may be used. The monoacyl compounds obtained thereby may be converted into the corresponding diacyl compounds by further acylation.

The following examples serve to illustrate the invention, without, however, limiting the same to them:

Example 1

1 g. of the "3-acetoxy methyldiol" produced by acylation, according to Schotten-Baumann, of the Grignard compound obtained by reacting methyl magnesium iodide with crystallized follicle hormone in ether solution, followed by hydrolysis with HCl, dilution with water and extraction with ether, as described in the above mentioned application Serial No. 748,664, is hydrogenated in glacial acetic acid solution with hydrogen in the presence of platinum oxide catalyst according to Adams-Shriner at room temperature while shaking, until the benzene nucleus is completely saturated. The reaction solution, freed from the catalyst, is evaporated in a vacuum to dryness, whereby the "3-acetoxy hexahydro methyldiol" is obtained.

Example 2

1 g. of follicle hormone hydrate acetylated on the phenolic hydroxy group, is dissolved in 200 cc. of ethyl alcohol and then treated with hydrogen in the presence of 1 g. of a previously reduced nickel catalyst, at 180° C. and 100 atmospheres in a stirring autoclave. After complete hydrogenation the reaction solution, freed from the catalyst, is evaporated to dryness. As residue there remains a viscous resin.

The following structural formulas serve to illustrate the compounds used as starting materials and obtained by the invention:

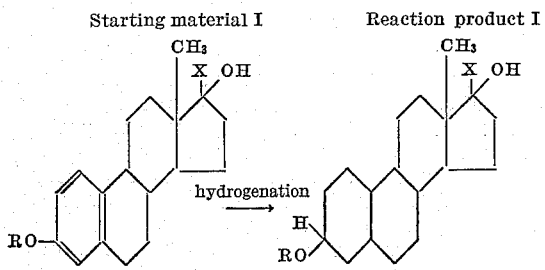

wherein X is an alkyl or aryl group and R an acyl group.

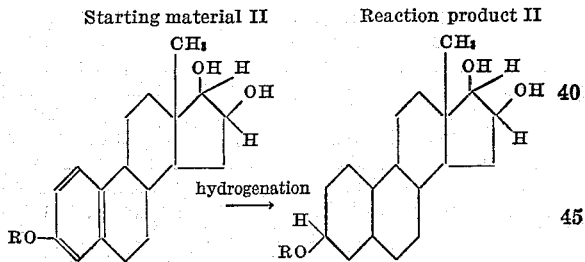

wherein R is an acyl group.

Other starting materials may, of course, be employed and changes in the reaction conditions and proportions may also be resorted to within the scope of the appended claims without departing from the principles of the invention. Thus the acyl groups of a polyester need not be the same, the product being then a mixed ester.

We claim:

1. A method of producing derivatives of germinal gland hormone preparations, comprising subjecting a follicle hormone hydrate derivative of the following structural formula

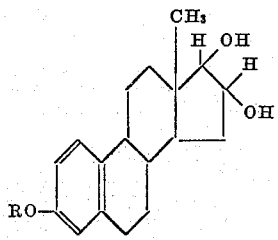

wherein R represents an acyl group, to the action of a reducing agent capable of hydrogenating the benzene nucleus in the molecule of said starting material into a hydro-aromatic nucleus, stopping the hydrogenation when the benzene nucleus has been hydrogenated, and recovering a compound of the formula

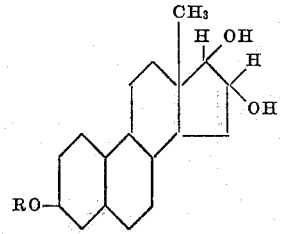

2. Acyl derivatives of cyclopentano tetradecahydro phenanthrene compounds of the following structural formula

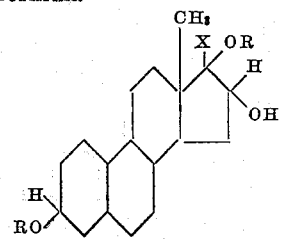

wherein X is a member of the group consisting of hydrogen, alkyl and aryl radicals, and R, R are the same or different acyl groups; said derivatives having a physiological activity similar to that of the male sex hormones.

3. Acyl derivatives of cyclopentano tetradecahydro phenanthrene compounds of the following structural formula

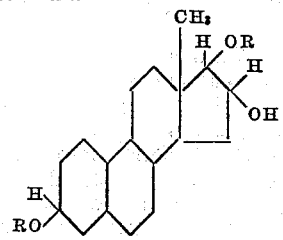

wherein R, R are the same or different acyl groups; said derivatives having a physiological activity similar to that of the male sex hormones.

4. Acyl derivatives of cyclopentano tetradecahydro phenanthrene comounds of the following structural formula

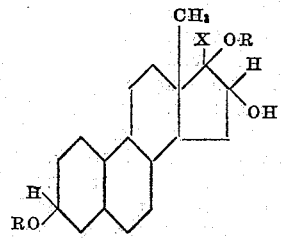

wherein X is a hydrocarbon radical, and R, R are the same or different acyl groups; said derivatives having a physiological activity similar to that of the male sex hormones.

5. Acyl derivatives of cyclopentano tetradecahydro phenanthrene compounds of the following structural formula

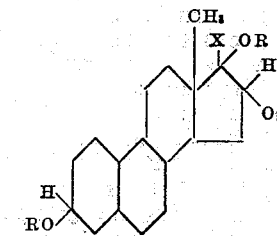

wherein X is an alkyl radical, and R, R are the same or different acyl groups; said derivatives having a physiological activity similar to that of the male sex hormones.

6. A method of producing acyl derivatives of germinal gland hormone preparations, comprising subjecting an acyl derivative of the following structural formula

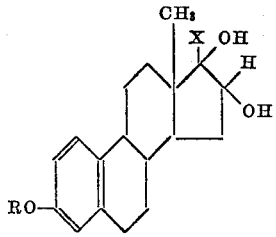

wherein X represents a member of the group consisting of hydrogen, alkyl, and aryl radicals, and R is an acyl group, to the action of a reducing agent capable of hydrogenating the benzene nucleus into a hydro-aromatic nucleus, and stopping the reaction when the benzene nucleus has been hydrogenated.

7. A method according to claim 6, wherein the hydrogenated mono-acyl derivative is converted into the corresponding poly-acyl compound by further acylation.

8. Acyl derivatives of cyclopentano tetradecahydro phenanthrene compounds of the following structural formula

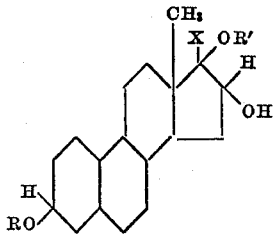

wherein X is a hydrocarbon radical, R is an acyl group, and R' is a member of the group consisting of hydrogen and acyl; said derivatives having a physiological activity similar to that of the male sex hormones.

WALTER SCHOELLER.
FRIEDRICH HILDEBRANDT.
ERWIN SCHWENK.